United States Patent
Kramarenko

(10) Patent No.: US 10,184,772 B2
(45) Date of Patent: Jan. 22, 2019

(54) COMPUTERIZED CALIPER

(71) Applicant: Sergii Kramarenko, Kharkov (UA)

(72) Inventor: Sergii Kramarenko, Kharkov (UA)

( * ) Notice: Subject to any disclaimer, the term of this patent is extended or adjusted under 35 U.S.C. 154(b) by 0 days.

(21) Appl. No.: 15/102,602

(22) PCT Filed: Jul. 30, 2015

(86) PCT No.: PCT/IB2015/055763
§ 371 (c)(1),
(2) Date: Jun. 8, 2016

(87) PCT Pub. No.: WO2016/124992
PCT Pub. Date: Aug. 11, 2016

(65) Prior Publication Data
US 2018/0164088 A1 Jun. 14, 2018

(30) Foreign Application Priority Data
Feb. 3, 2015 (UA) .................... 201500851

(51) Int. Cl.
*G01B 3/20* (2006.01)
*G01B 5/00* (2006.01)

(52) U.S. Cl.
CPC .............. *G01B 3/20* (2013.01); *G01B 3/205* (2013.01); *G01B 5/0014* (2013.01)

(58) Field of Classification Search
CPC .................................. G01B 3/20; G01B 3/205
USPC ..................................................... 33/783, 784
See application file for complete search history.

(56) References Cited

U.S. PATENT DOCUMENTS

| | | | | |
|---|---|---|---|---|
| 5,029,402 A | * | 7/1991 | Lazecki | G01B 3/002 33/784 |
| 8,931,182 B2 | | 1/2015 | Raab et al. | |
| 9,631,913 B2 | * | 4/2017 | Lefebvre | G01B 3/18 |
| 2003/0217478 A1 | * | 11/2003 | Matsumiya | B82Y 30/00 33/784 |
| 2008/0052942 A1 | * | 3/2008 | Kawatoko | G01B 3/205 33/702 |
| 2012/0203504 A1 | * | 8/2012 | Jordil | G01B 3/205 702/162 |
| 2015/0059431 A1 | * | 3/2015 | Lefebvre | G01B 21/042 73/1.79 |
| 2016/0061574 A1 | * | 3/2016 | Saito | G01B 3/205 33/811 |

FOREIGN PATENT DOCUMENTS

| | | |
|---|---|---|
| EP | 2696162 A1 | 2/2014 |
| JP | 2010038730 A | 2/2010 |
| UA | 47246 U | 1/2010 |
| WO | WO/2001/065202 | 9/2001 |

* cited by examiner

*Primary Examiner* — G. Bradley Bennett

(57) ABSTRACT

Computerized Caliper consists of measuring bar with fixed jaw, moving frame with moving jaw and a measurement and computer block. Measurement and computer block installed on the moving frame comprises digital measurement device of a vernier caliper, a computer, to which a temperature transmitter is connected, and a photo-camera.

1 Claim, 1 Drawing Sheet

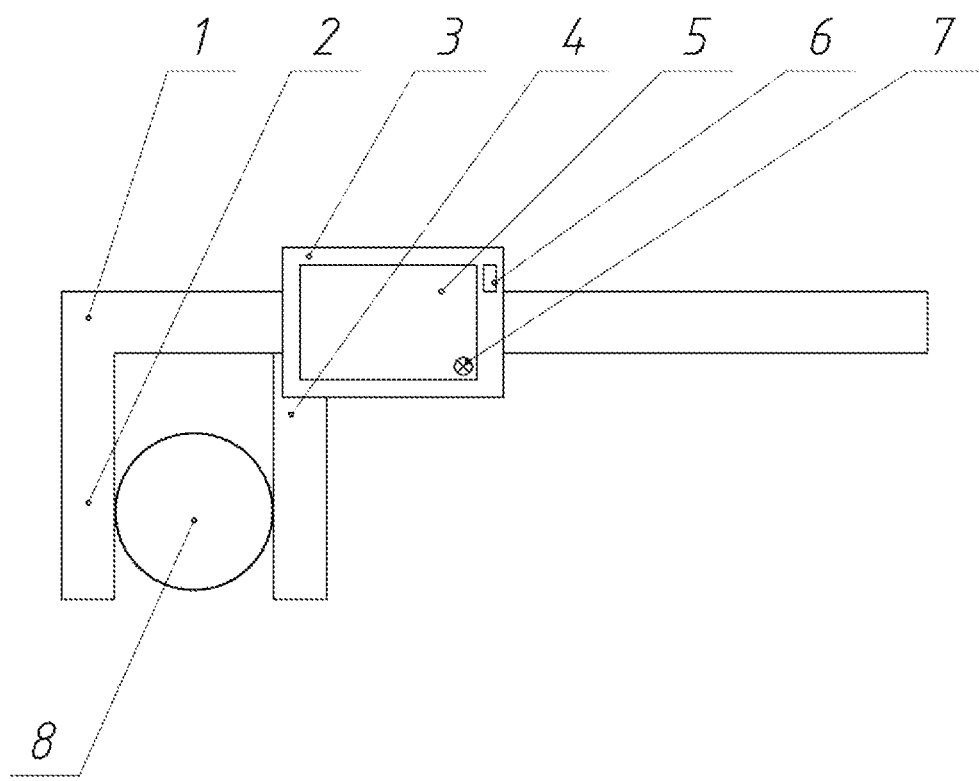

COMPUTERIZED CALIPER

BACKGROUND OF THE INVENTION

Field of the Invention

The invention relates to the control measuring tools for measurement of the linear dimensions. The subject Computerized Caliper can be used in the machine-building and other industries, where the accurate measurements with recording, mathematical processing and measurement results analysis are required.

Description of the Related Art

As of today, the vernier calipers with the digital measuring indicator, which are connected to the computer with different wired or wireless methods (infra-red, radio-waves or others), are commonly used worldwide for the purpose of vernier caliper measurement with the subsequent recording, mathematical processing and analysis of the measurement results.

In all the cases the existing vernier calipers with digital measurement indicator working with computer in terms of their design are detached from the computer (arranged in different casings, have different controls and algorithms).

The operator performs only the operations of measurement and data transfer to the computer by means of the vernier caliper, however, it is not possible to control the work of computer from the vernier caliper.

The computer, which is connected to the vernier caliper (by wire or by wireless way) can process the information received from the vernier caliper upon the command from the operator, however, it cannot manipulate the measurement process. In case of detachment of the vernier caliper and computer in time and space, the technological problems often occur related to the measurements and processing of the obtained results.

The task of development of the invention "Computerized Caliper" was the following:

to increase of the measurement accuracy through making up the measuring scale errors, temperature-related errors from the vernier caliper and measurement detail;

expediting and convenience of the computer recording processes, mathematical processing and analysis of the measurement results only by means of the vernier caliper (removing of the second operator position at the computer).

The vernier caliper of quite widespread series 550 made by the Japanese company MITUTOYO with the digital measurement indicator, having the capability of computer interface through the ports of several standards for increasing the capabilities of data transferring was selected as a prior art.

The disadvantages of the well-known vernier caliper with the digital measurement indicator of series 550 made by MITUTOYO company with the possibility of use of different ports for communication with computer are the following:

inconvenience and high probability of errors at the simultaneous use of two devices (vernier caliper for the measurement and the computer for processing of information, as measured by the vernier caliper);

lack of making up of the vernier caliper errors in terms of the measuring scale;

lack of making up the thermal errors in case of the temperature deformations of detail and vernier caliper with the digital measurement indicator itself under the actual working conditions;

increased time and monetary costs for exclusively custom programming in each case of application of the vernier caliper with the digital measurement indicator along with the computer;

impossibility of performing the express service and metrological control with mathematical correction of the vernier caliper error after the operation and repair of digital indicator vernier caliper.

SUMMARY OF THE INVENTION

The subject invention is about the design combination in one measurement and computer block (in a single casing) of a digital measurement device, computer and photo-camera. This combined measurement and computer block is arranged on a movable frame, which moves along the measurement bar of the device.

The measurement and computer block of the Computerized Caliper can perform the following:

reading and coding of the information on the linear movement of the movable frame with measurement and computer block along the measuring frame of the vernier caliper;

mathematical correction of the measurement information taking into account the preset standard making up algorithm of the linear error of the frame movement along the measuring bar;

correction of the measurement information according to the preset algorithm of the thermal compensation of the temperature deformation error of the detail being measured and the Computerized Caliper, when the actual measurement conditions deviate from the normal measurement conditions;

recording and correction (if required) of the erroneous measurements according to the algorithms as preset or preprogrammed by the operator;

mathematical processing and analysis of the measurement results according to the established standard algorithms or the algorithms preprogrammed by the operator;

transferring of the measurement records, results of the mathematical processing and analysis of the measurement results to the independent media (flash-memory or other) or (by wire or wireless method) to the peripheral computer.

Photo-camera complete with other components of a vernier caliper is destined for rating each detail being measured and records the following data:

the time for measurement of a detail,
temperature of detail being measured,
visual image of detail together with the identification signs,
measurement readings,
online size indicator,
the results of their mathematical processing for each detail being measured.

Rating the detail being measured ensures absolutely new technical and economical performance of the vernier caliper:

Possibility of exclusion of the erroneous measurements of the similar details (due to the availability of image of each of details with respective markings with bar-codes, serial numbers-figures, colours or with other type of visual identification);

Possibility of authentic control of the user working time, operation log and rhythm (due to the connection of image of the detail being measured and the measurement time);

Possibility of authentic control of the quantity of the details being measured, availability of contaminations, defects and mechanical damages, other deviations (due to association of the image of detail being measured with the measurement time);

Possibility of technical control and maintaining the rated temperatures for each detail (due to association of the image with temperature of detail).

Possibility to ensure the user safety when measuring every heated detail (due to association of the image with temperature of the detail being measured).

BRIEF DESCRIPTION OF THE DRAWINGS

The essence of the invention is indicated in the sketch, where the Computerized Caliper, longitudinal section is indicated.

FIG. 1 is a schematic representation of the structure of the Computerized Caliper claimed.

The invention "Computerized Caliper" consists of a measuring bar 1 with a fixed jaw 2, a moving frame 2 with a moving jaw 4; and at the same time it is different from the well-known prior art in the fact that measurement and computer block 5, which comprises digital measurement device of the vernier caliper, computer, to which a temperature transmitter 6 is connected, and a photo-camera 7, are installed on a moving frame 3 (refer to sketch).

DETAILED DESCRIPTION

The measurement and computer block 5 of the Computerized Caliper by design combines the conventional digital measurement device of the conventional vernier caliper and minicomputer in a single casing. The measurement and computer block 5 is fastened on the moving frame 3 of the Computerized Caliper (refer to sketch).

The measurement and computer block 5 of the Computerized Caliper has a touch screen (with sensor and mechanical buttons), where the following information can be displayed, as desired by the operator:

Calendar date and time, temperature of the Computerized Caliper;

Photo and temperature of the detail (detail place being measured);

Unique parameters of the next measurement of the detail;

Series of the repeated measurements of the detail (3, 5, 10 or by the order), which are incorporated in the table;

Table of the mathematical processing of the series of repeated measurements (3, 5, 10 or by the order), including average, mean absolute error, mean root square deviation;

Individual uncertainty calculation of type B of the Computerized Caliper of the indicated standard size;

Record of the periodic metrological control of the Computerized Caliper.

The invention "Computerized Caliper" is used in the following manner: The Computerized Caliper is switched on by pushing the respective button (mechanical or sensor) of the measurement and computer block 5; with that the temperature of the engaged Computerized Caliper is displayed on the screen, which temperature is recorded in the measurement and computer block (refer to sketch). The measurement jaws 2 and 4 are brought together and the readings of the Computerized Caliper are set to zero (refer to sketch). The actual temperature of detail 8 is determined by means of the temperature transmitter 6 (for the large-size details 8 the temperature is determined in the particular measurement place) and photo-camera 7 takes a photo of detail, this information is recorded in the measurement and computer block 5 (refer to sketch). The measurement mode (single or repeated measurements) is set on the screen of the measurement and computer block 5 by means of buttons and the table format is selected for mathematical processing of the measurement results (refer to sketch). The temperature correction of the measurement error is performed taking into account the actual temperatures of the Computerized Caliper and detail 8, obtained by means of the temperature transmitter 6 (refer to sketch). The detail being measured 8 is grasped between the measuring jaws 2 and 4 and the information is read from the screen of the measurement and computer block 5 of the Computerized Caliper (refer to sketch). If required, the erroneous values of measurements, including the tabular ones, are removed, by means of the sensor buttons of the measurement and computer block 5 (refer to sketch). After every metrological control of the measurement equipment tool "Computerized Caliper" (periodic, current and after the repair) the mathematical linear making up of the error of moving frame 3 movement along the measuring scale 1 (refer to sketch).

According to the claims of invention "Computerized Caliper" the applicant fabricated the operative embodiment and performed comparative test together with the commercial vernier caliper made by MICROTECH (Kharkov, Ukraine) having the digital measurement device and communication port with computer /2/, which has been introduced to the State Registers of Ukraine and Russian Federation (mostly, widespread in Ukraine), which is as good as Japanese prior art MITUTOYO /1/, refer to table.

TABLE

| No. | Comparative parameters Vernier caliper with computer | Invention "Tablet Caliper" | Prior art ShCC (ШЦЦ)-500 MICROTECH with MIS by MICROTECH/2/ |
|---|---|---|---|
| 1. | Measurement range, mm | 0-500 | 0-500 |
| 2. | Division value, mm | 0.01 | 0.01 |
| 3. | Measurement error, mm | 0.25 | 0.05 |
| 4. | Weight of the vernier caliper with computer, kg | 1.45 | 2.35-6.5 |
| 5. | Number of the operators involved, pers. | 1 | 2 |
| 6. | Linear compensations of scale errors | + | − |
| 7. | Thermal compensation of errors | + | − |
| 8. | Camera | + | − |
| 9. | Temperature transmitter | + | − |

The comparative analysis of the suggested invention "Computerized Caliper" and commercial up-to-date sample of the vernier caliper by MICROTECH, mod. ShCC (ШЦЦ)-500 with MIS for interfacing with computer /1/as given in the table, indicates the possibility of the practical implementation and absolute technical and economical advantages of the invention "Computerized Caliper".

The suggested invention "Computerized Caliper" opens new higher level of the digital vernier calipers, which considerably surpass all the today's models of vernier calipers in terms of their parameters and technological capabilities.

The invention claimed is:
1. A Computerized Caliper comprising:
   a measurement bar with a fixed jaw;
   a moving frame with a moving jaw; and
   a measurement and computer block, which combines
      a digital measurement device of a vernier caliper, and
      a computer that corrects error of linear displacements of a moving frame along a measuring bar, and
      a photo-camera which provides photos of detail with the measurement time to a measurement and computer block, where they are stored along with measuring protocol and mathematical processing results; and
   a temperature transmitter which monitors temperature of detail and vernier caliper for compensation in a measurement and computer block of temperature deformation error of detail and vernier caliper.

* * * * *